Oct. 18, 1966  J. E. CHAPMAN  3,280,352
ELECTRIC MOTOR HAVING ELECTROMAGNETIC CLUTCH-BRAKE
Filed July 3, 1963
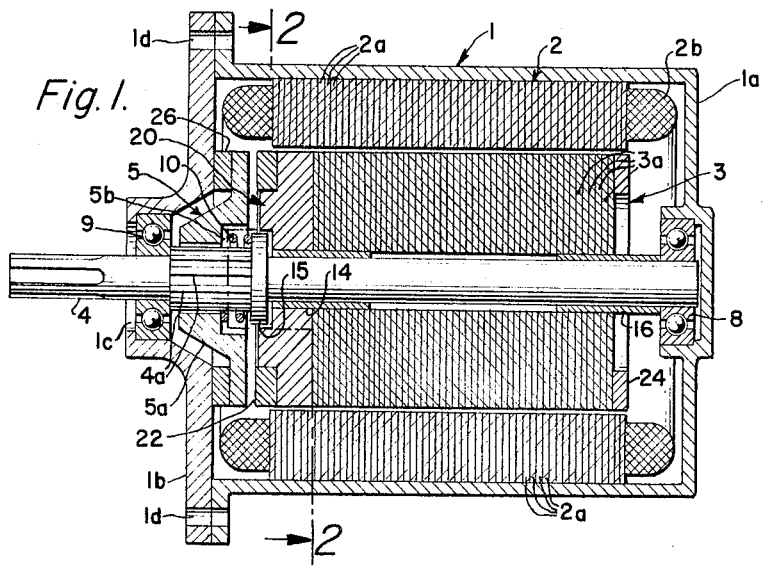
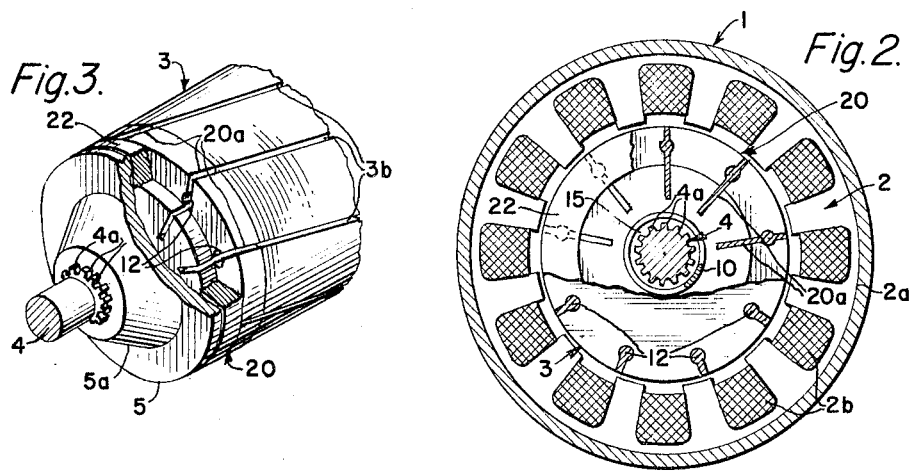
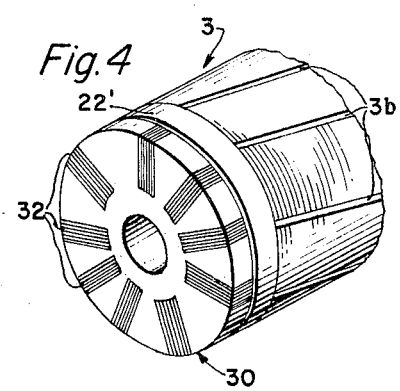
INVENTOR.
JAMES E. CHAPMAN,
BY
Luther P. Speck
Attorney

United States Patent Office 3,280,352
Patented Oct. 18, 1966

3,280,352
ELECTRIC MOTOR HAVING ELECTROMAGNETIC CLUTCH-BRAKE
James E. Chapman, Palos Verdes Estates, Calif., assignor to The Garrett Corporation, Los Angeles, Calif., a corporation of California
Filed July 3, 1963, Ser. No. 292,598
3 Claims. (Cl. 310—76)

An electric motor in accordance with this invention embodies an automatic, magnetic clutch-brake for reducing braking inertia by disenaging the motor drive shaft from the inertial mass of the rotor whenever electric power is interrupted, and effecting a driving engagement between the rotor and the drive shaft when electrical power is restored. These results are accomplished through use of a novel, compact, and light weight magnetic structure wholly enclosed within the motor housing, and operated in respose to a portion of the magnetic flux developed in the magnetic circuit of the motor. Although described below as embodied in an induction motor, the novel concepts of this invention may be utilized in motors of many types, including those designed to operate from single or poly phase A.-C. power sources.

Electric motors in accordance with this invention have a unique clutch-brake structure designed to release the brake and engages a clutch between the drive shaft and rotor when the motor is energized, and to re-engage the brake automatically when the motor is de-energized.

In the case of conventional electromagnetic motor brakes, the total load on the brake includes the inertial mass of the rotor in addition to that of the load coupled to the output shaft. This means that the brake structure must have a greater braking capacity than would be the case if the inertial mass of the rotor were to be decoupled automatically from the output shaft at the time of braking. Moreover, it would be possible to minimize the size and weight of the brake structure, factors of great importance in many critical applications. Accordingly, mtotors incorporating the novel magnetic clutch-brake described below are characterized by improved braking efficiency and economics in size and weight. These improvements are effected through use of a simple but novel structure entirely enclosed within the motor housing and operable in response to a portion of the flux normally present in the magnetic circuit of the motor. In general, these results are achieved by mounting the rotor for rotation relative to the output shaft of the motor, and then providing an armature of magnetic material mounted slidably but nonrotatively on the output shaft to effect a clutching engagement between armature and rotor in response to the magnetic field of the latter when the motor is energized, and a braking engagement between the armature and motor frame when the motor is de-energized.

Accordingly, the principal objectives of this invention include the provision of:

(1) A single or poly phase A.-C. motor having a magnetic clutch-brake structure;

(2) A single or poly phase A.-C. electric motor having an integral magnetic clutch-brake structure compatible with existing functional and structural aspects of motor design practice;

(3) An electric motor capable of braking a driven load while the latter is decoupled from the rotating inertial mass of the rotor;

(4) An electric motor capable of decoupling the respective inertial masses of the rotor and driven load, and braking the latter automatically when the motor is de-energized;

(5) An electric motor having a magnetic brake-clutch structure operable in response to a portion of the electromagnetic flux normally developed in the magnetic circuit of the motor to effect a driving engagement between the rotor and the output shaft when the motor is energized, and to release the driving engagement and brake the output shaft to a stop free from the loading influence of the inertial mass of the rotor when the motor is de-energized;

(6) An electric motor having a magnetic clutch-brake structure compatible with electric motors of conventional design, and characterized by high braking efficiency, compactness, and light weight;

(7) An electric motor incorporating an automatic magnetic clutch-brake of superior economy and engineering simplicity for achieving the afore-stated objectives.

An exemplary embodiment of this invention comprises an electric motor having a rotor mounted for rotation relative to an output shaft. An armature of magnetic material is mounted slidably but non-rotatively on the shaft adjacent to one end of the rotor. A polarizer made of magnetic material is mounted fixedly on the end of the rotor adjacent to the armature for directing a portion of the rotor flux into an axially-oriented external electromagnetic field when the motor is energized. A coil spring disposed around the output shaft between the polarizer and the armature normally thrusts the latter into engagement with a breaking element affixed to the motor frame to brake rotation of the output shaft when the motor is de-energized. However, when the motor is energized, the axial field established by the polarizer pulls the armature away from the motor frame and into driving engagement with a clutch surface provided on the polarizer. In this manner, the armature is caused to shift longitudinally from a braking position to a clutching or driving position when the motor is energized. When the motor is de-energized, the coil spring automatically returns the armature to the braking position, and the output shaft and its connected load are braked to a stop in complete freedom from the rotating inertial mass of the rotor.

From the foregoing, it should be apparent that this invention provides an electric motor having a simple but novel clutch-brake structure for enhancing braking efficiency by disengaging automatically the output shaft from the inertial mass of the rotor prior to the initiation of braking action, and that maximum compactness and weight reduction are achieved with minimal effect on the functional and structural design aspects of conventional single and poly phase A-C. motors.

The preceding text is intended to summarize and explain the significance of this invention in relation to the problems which it resolves. For a more complete understanding of the structure, operation, and novel features of the preferred embodiment consider the following description with reference to the drawings wherein:

FIG. 1 represents a longitudinal cross-section through a novel motor incorporating the magnetic clutch brake of this invention;

FIG. 2 represents a cross-section through the motor intercepted by the plane 2—2 of FIG. 1;

FIG. 3 is a perspective view of the rotor-armature sub-assembly representing, in partial cutaway, various structural features thereof;

FIG. 4 is a perspective view of an alternative rotor-polarizer structure wherein the latter is made of non magnetic material having spaced-apart inserts of magnetic material.

As represented in FIGS. 1, 2 and 3, the novel electric motor generally comprises a hollow cylindrical housing 1, a hollow field structure 2 disposed fixedly within the housing, a rotor 3 supported within the field structure 2 for rotation around a rotatable output shaft 4, and a brake-clutch armature 5 mounted on the shaft 4 for axial but nonrotative translation between a mechanically-polarized braking position where it effectively engages the housing 1, and an electromagnetically-polarized, clutching position where it engages the adjacent end of the rotor 3 to impart driving torque to the output shaft 4.

The housing 1 has an integral end wall 1a provided with a centrally-disposed recess to accommodate a first bearing 8, and a housing cover 1b having an opening 1c for accommodating a second bearing 9 and the protruding end of output shaft 4. The housing cover 1b is secured in position by bolts (not shown) or other appropriate fasteners accommodated in the holes 1d.

The field structure 2 is conventional, being formed of circular laminations 2a of highly permeable, magnetic material having spaced-apart, radial notches around the inner edges, so that the laminations may be stacked with notches aligned to form grooves for accommodating the longitudinal segments of field windings 2b. Although connecting leads and terminals are not shown, it should be understood that the windings 2b may be energized in any conventional manner from an appropriate source of alternating current.

The rotor 3 likewise is formed of stacked laminations 3a of magnetic iron or other highly-permeable magnetic material. In accordance with conventional practice, the rotor laminations are provided with radial notches so that when proper alignment is achieved during stacking, spiral slots 3b will be formed to accommodate current-conductive rotor bars 12. In addition, the rotor laminations 3a have central openings of slightly greater diameter than the output shaft 4 so that sleeve bearings 14 and 16 may be inserted to facilitate freedom of rotation of the rotor 3 around shaft 4.

To establish an axially-oriented electromagnetic field for effecting longitudinal translations of the brake-clutch armature 5 from its mechanically-polarized braking position to its electromagnetically polarized clutching position, a polarizer 20 is included on the end of the rotor 3 adjacent to armature 5. The polarizer 20, preferably fabricated of sintered axially-oriented magnetic iron, is shaped as a disc having radial slots 30a constituting non-magnetic gaps in the magnetic structure, and an annular groove is provided around one edge to accommodate a first current-conductive end ring 22 for inter-connecting the ends of rotor bars 12. A similar groove is provided on the other end of rotor 3 to accommodate a second end ring 24. The nonmagnetic gaps 20a preferably are filled with aluminum or other nonmagnetic material. The axial dimension of the first end ring 22 is slightly greater than the axial depth of its mounting groove so that the end ring 22 will protrude far enough beyond the end of the polarizer 20 to provide a clutch face for engagement by the armature 5. In accordance with well known techniques, the end rings and rotor bars may be cast directly onto the lamination-polarizer subassembly to form a unitary rotary structure.

The armature 5, made of sintered iron or other magnetic material, has a hub 5a provided with axially-oriented teeth which mate with the splines 4a of output shaft 4. This prevents the armature 5 from turning relative to the shaft 4, but enables sliding movement back and forth across the gap between the end of rotor 3 and the housing cover 1b. The armature hub 5a has a recess 5b for accommodating one end of a coil spring 10, or other compressible resilient element. A washer 15, mounted on the shaft 4 between the rotor and armature prevents axial displacement of the former as the result of the magnetic force of attraction exerted on the latter when the motor is energized. Any axial displacement of the rotor in the opposite direction is, of course, prevented by fixedly securing the rotor to sleeve bearings 14 and 16 by any convenient means, such as a "force fit," for example. In addition, the washer 15 provides support for the other end of the coil spring 10.

A brake shoe 26, or other appropriate friction surface is provided on the inner side of housing cover 1b so that it will engage the armature 5 when the latter is in its mechanically-polarized braking position. In lieu of the transverse braking surface represented in the drawings, the brake shoe 26 and armature 5 may be provided with tapered surfaces. This may improve braking efficiency by facilitating an increase in the area of braking engagement and maximization of the radial distance of the operative braking surface from the axis of rotation.

In operation the electromagnetic flux resulting from the flow of electric current through the field windings 26 when the motor is energized bridges the gap between the stator structure 2 and the polarizer 20, and has the effect of establishing magnetic poles of opposite polarity across the radial gaps 20a. The electromagnetic flux between these poles seeks to traverse the gaps 20a along paths of lowest permeability through the magnetic iron of brake-clutch armature 5. Accordingly, the armature 5 is attracted into its magnetically-polarized clutching position against the clutch surface of end ring 22, and rotation of the rotor 3 is imparted to the output shaft 4 via the armature 5.

When the motor is de-energized, the armature 5 is released from its magnetically-polarized position, and forced by the coil spring 10 into its mechanically-polarized braking position against the brake shoe 26. As a result, rotation of the output shaft 4 and its load ends abruptly, while the inertial mass of rotor 3 continues to coast freely to a stop. It should be noticed that the kinetic energy of the coasting rotor 3 may be utilized advantageously to overcome the static inertia of the output shaft 4 and its connected load in applications requiring cyclic start-stop operation with relatively short stopping intervals. A further advantage is that the inertial mass of the rotor 3 is decoupled from the shaft 4 during braking. This enhances braking performance by relieving elements of the brake structure from the necessity of absorbing the kinetic energy of the rotor.

An alternative form of polarizer 30, represented in FIG. 4, is made of aluminum or other suitable non-metallic material, and opposing magnetic poles are established in mutually adjacent longitudinally-oriented, laminated stacks 32 of magnetic iron or other material mounted in spaced-apart radial gaps in the non-magnetic body of the polarizer 30. The laminations of the stacks 32 are oriented longitudinally and radially in order to form the requisite axial magnetic field. In this specie of the invention, the current-conductive end ring 22' interconnecting the ends of rotor bars 12, is mounted in a circumferential groove formed on the end of the rotor 3 by laminations (not shown) of reduced radii.

The principle of operation polarizer 30 in establishing a magnetic attraction for the armature 5 is the same as that described above in connection with the exemplary embodiments of FIGS. 1, 2 and 3. Electromagnetic flux originating in the stator structure 2 develops opposite magnetic poles in mutually adjacent laminated stacks 32. The magnetic circuit between the poles tends to direct itself along paths of lowest permeability, and in so doing magnetically pulls the armature 5 into the magnetically polarized clutching position against rotor 3. Although not shown in FIG. 4, it should be understood that, if desired, any one of a number of well known clutch surfaces may be provided on the exposed end of the polarizer 30.

The above text makes it evident that electric motors embodying this invention are capable of positive start-stop operation with minimum slippage of clutch and brake. In short cycle start-stop operation, achievement of positive braking action is attributable to the automatic decoupling of the rotor 3 from the output shaft 4 which occurs when the motor is de-energized. The minimization of clutch slippage in starting is attributable to the fact that the rotor 3 already is rotating freely when the motor is re-energized. As a consequence, positive brake-clutch action is achieved with an ingenious but relatively simple structure.

It is expected that the novel concepts expressed or inferable from the drawing and text of this disclosure will enable the design of a variety of embodiments within the scope of the invention as represented in the following claims.

I claim:
1. An electric motor comprising:
   (a) a frame;
   (b) an output shaft mounted rotatably on said frame;
   (c) a stator assembly secured on said frame and comprising an electromagnetic field structure disposed about the axis of said shaft;
   (d) a first magnetizable rotor portion mounted rotatably on said shaft;
   (e) a second magnetizable rotor portion adjacent said first rotor portion and mounted rotatably therewith on said shaft,
   the length of both said rotor portions along the axis of said shaft being substantially equal to the length of said field structures along the axis of said shaft,
   the axial length of said first rotor portion being substantially greater than the axial length of said second rotor portion,
   both said rotor portions being subject directly to substantially all of the field flux from said field structure; and
   (f) a magnetizable armature member mounted non-rotatably relative to said shaft and disposed for reciprocal movement along the axis thereof to engage said second rotor portion and form therewith a path for a substantial portion of the field flux substantially only therein to impart rotation of said rotor portions through said armature member to said shaft.

2. The motor of claim 1 in which said second rotor portion comprises a magnetizable polarizing member having radially and axially directed non-magnetizable inserts disposed at angular intervals about the axis of said rotor portion.

3. The motor of claim 2 further having resilient compression spring means disposed about the axis of said shaft and between said member and a shoulder on said shaft to effect disengagement between said member and said second rotor portion when said flux is removed.

References Cited by the Examiner
UNITED STATES PATENTS

| | | | |
|---|---|---|---|
| 2,408,808 | 10/1946 | Paulus et al. | 310—76 |
| 2,510,917 | 6/1950 | Turner et al. | 310—76 |

FOREIGN PATENTS 1,100,850  9/1955  France.

MILTON O. HISHFIELD, *Primary Examiner.*

A. J. ROSSI, *Assistant Examiner.*